Patented Sept. 24, 1946

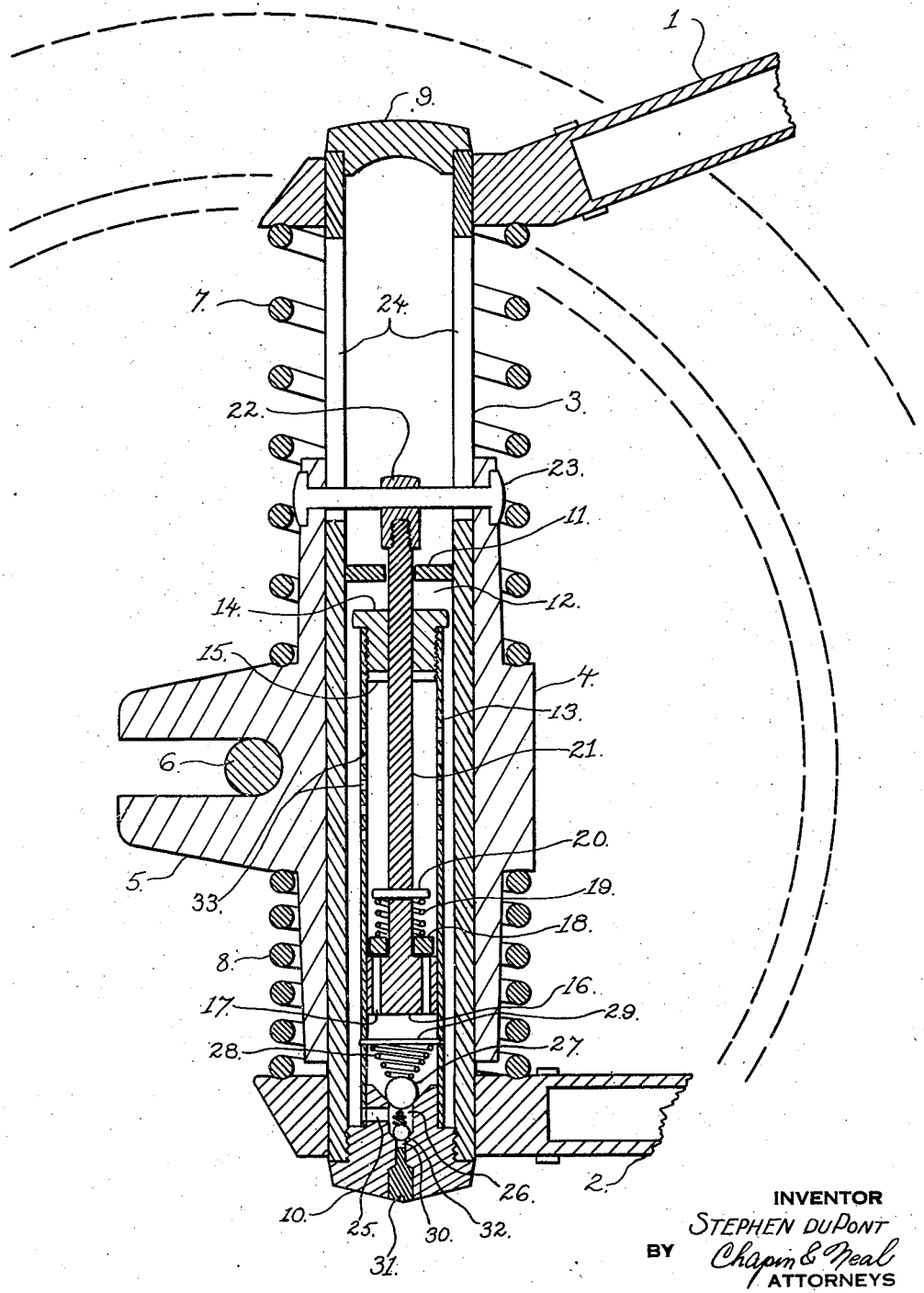

2,408,254

UNITED STATES PATENT OFFICE 2,408,254

SUSPENSION UNIT FOR VEHICLE WHEELS

Stephen du Pont, Wilbraham, Mass., assignor to Indian Motocycle Company, Springfield, Mass., a corporation of Massachusetts Application April 19, 1944, Serial No. 531,754

1 Claim. (Cl. 267—8)

This invention relates to a combined suspension and shock absorbing unit of the spring and liquid damping type suitable for application to a vehicle wheel and has for its object such an organization and combination of parts as will simplify the construction and facilitate the assembly and disassembly of such units.

A further object of the invention is to provide a combined unit of this character which will absorb shocks gradually and with increasing resistance as found desirable to suit a particular design in the application thereof to a vehicle wheel.

The present embodiment of the invention is illustrated in connection with the rear wheel suspension for a motorcycle to which use it is particularly adapted because of simplicity and compactness in design. By change in immaterial parts of the design it may be adapted to the front wheel of a motorcycle or to other vehicle wheels.

Further objects and advantages of the invention will become apparent from the following description taken in connection with the accompanying drawing which shows one suitable embodiment thereof and in which the figure is a vertical section of the assembled unit shown as connected between the upper and lower frame members at the rear of a motorcycle.

Referring more particularly to the drawing, the upper and lower members at the rear and right side of the motorcycle frame are indicated at 1 and 2 and connected between these members is a somewhat vertically disposed hollow post or slipper spindle 3. In some instances the spindle 3 may be more inclined to the vertical than as here shown. Sleeved upon the spindle 3 for up and down sliding movement thereon is a slipper bracket 4, a rearward extension 5 of which receives the axle 6 of a rear wheel shown in dotted lines. The slipper bracket 4 is formed as shown with tubular extensions one above and one below the mid section of said spindle. The rear axle support 5 is an integral projection from the mid portion of said slipper bracket. It will be understood that the arrangement of parts here described is duplicated at the left rear side of the frame and that the ends of axle 6 are supported in two of said extensions 5 in any of the usual ways.

In my preferred arrangement a load carrying spring 7 surrounds the spindle and the upper extension of the bracket and is interposed between the bracket 4 and the upper frame member 1 and a recoil spring 8 surrounds the spindle and the lower extension of the bracket and is positioned between said bracket and said lower frame member 2. By means of the springs 7 and 8 the bracket is resiliently maintained in an intermediate position on said spindle 3.

The top end of the spindle 3 is capped by a top closure plug 9 and the lower end of said spindle is closed by a bottom plug closure 10. Part way down from the top of said spindle and on the inside thereof is positioned a partition 11 which closes off the lower part of said hollow spindle and forms therein a reservoir chamber 12 adapted to be filled with a damping liquid such as oil commonly used in hydraulic-shock absorbers.

The bottom plug 10 is suitably screw threaded into the end of said spindle and said plug has a reduced inner end upon which is fixed or welded a dash-pot cylinder 13. This cylinder 13 extends upwardly within the chamber 12 and is preferably spaced from the interior wall of the spindle as shown. It is provided with a cylinder head 14 which is screw threaded into the upper end of the cylinder 13. At the lower or underside of said head 14 a key way slot 15 is formed.

Reciprocably movable within the cylinder 13 is a dash-pot piston 16 slidably fitted to the inner wall of said cylinder and having one or more rebound orifices therethrough such as 17. A rebound relief valve 18 at the top of said piston yieldingly closes said orifices 17 by means of valve spring 19 held in position by retaining pin 20 fixed crossways in the piston connecting rod 21. This retaining pin 20 also serves as a key for fitting into the aforesaid slot 15 of the cylinder head 14 for unscrewing the same from its cylinder 13 in the disassembly of the parts.

The connecting rod 21 fastened to piston 16 extends upwardly through head 14, and partition 11 and has screw fastened to its upper end by a screw thread, a cap lug 22. A cross pin 23 which extends diametrically of the spindle 3 through slots 24 thereof, unites the lug 22 and its connecting rod 21 to the upper end of the slipper bracket 4. In this manner the piston 16, slipper bracket 4 and rear wheel axle 6 will all move together relatively to the spindle 3 and cycle frame.

In the lower end plug 10 there is formed a horizontal feed passage 25 communicating with a vertical passage 26 which provide for inlet of oil from the reservoir 12 into the dash-pot cylinder 13. A check valve 27 held in position by valve spring 28 and retaining pin 29 is employed to control this oil feed inlet passage. The lower end of vertical passage 26 is accessible to the exterior of plug 10 through a filling opening 30 normally closed by a removable supplemental plug 31. A spring pressed ball check valve 32 is provided for this filler opening 30. A measured quantity of oil may be introduced into chamber 13 through the filler opening 30 by any suitable type of grease gun and the check valve 32 will prevent leakage when the gun is removed and while the supplemental plug 31 is being replaced.

In normal use the reservoir chamber 12 and the dash-pot cylinder 13 are substantially full of oil which is circulated between the cylinder and reservoir by the pumping action of the dash-pot piston. The discharge of oil from cylinder 13 into reservoir 12 during an upward stroke of piston 16 is accomplished in such manner that a gradually increasing resistance is presented to said upward or bounding stroke of the piston. For this purpose the outlet or discharge ports for the cylinder are in the form of a series of vertically spaced orifices 33 at the upper part of said cylinder 13, which orifices are successively closed off by the upward stroke of said piston 16. This action effectively dampens the upward stroke of the piston and checks the bounding action of the vehicle wheel. The combination of the spring suspension and dampening action of the dash-pot shock absorber as described is found to be very effective in producing smooth and comfortable riding of the motorcycle over rough roads. Moreover this advantageous result is accomplished without cumbersome additions to the slipper spindle and bracket suspension heretofore in common use, the compact structure of the present design having the same simplicity in outward appearance as in the usual rear wheel suspension of motorcycles. Heretofore it has not been common to provide hydraulic damping for the rear wheel of a motorcycle. My invention is embodied in a form which may very easily be adapted to the existing types of motorcycles as a conversion job.

I claim:

A suspension mounting for a vehicle wheel comprising in combination, upper and lower members of a vehicle frame, a hollow spindle fastened at its upper end to said upper frame member and at its lower end to said lower frame member, a slipper bracket comprising a sleeve portion having extensions above and below the mid section of said spindle and slidably mounted on the outside of said spindle, said slipper bracket having an integral fork portion midway between its upper and lower ends for carrying the axle of said wheel, a load carrying spring surrounding said spindle and the upper extension of said slipper bracket and having a bearing against said upper frame member, and a recoil spring surrounding said spindle and the lower extension of said slipper bracket and having a bearing against the lower frame member, said spindle having formed therein at its lower part a closed chamber containing liquid, a dash-pot piston and its cylinder mounted within said chamber with inlet and outlet ports for the interflow of liquid between said cylinder and chamber, a connecting rod extending from said piston to the upper part of said spindle, and a cross pin extended through a slot in the upper part of said spindle and united to the upper end of said connecting rod and to the upper end of said slipper bracket upper extension whereby said piston is moved up and down within its cylinder by movements of the wheel relative to the vehicle frame.

STEPHEN DU PONT.